US012621504B2

(12) United States Patent
    Newton

(10) Patent No.: US 12,621,504 B2
(45) Date of Patent: May 5, 2026

(54) TECHNIQUES FOR CACHING MEDIA CONTENT WHEN STREAMING LIVE EVENTS

(71) Applicant: NETFLIX, INC., Los Gatos, CA (US)

(72) Inventor: Christopher Alan Newton, North Richland Hills, TX (US)

(73) Assignee: NETFLIX, INC., Los Gatos, CA (US)

( * ) Notice: Subject to any disclaimer, the term of this patent is extended or adjusted under 35 U.S.C. 154(b) by 87 days.

(21) Appl. No.: 18/296,950

(22) Filed: Apr. 6, 2023

(65) Prior Publication Data

US 2024/0340467 A1 Oct. 10, 2024

(51) Int. Cl.
    *H04N 21/2187* (2011.01)
    *H04N 21/222* (2011.01)
    *H04N 21/231* (2011.01)
    *H04N 21/845* (2011.01)

(52) U.S. Cl.
    CPC ..... *H04N 21/2187* (2013.01); *H04N 21/2223* (2013.01); *H04N 21/23106* (2013.01); *H04N 21/8456* (2013.01)

(58) Field of Classification Search
    None
    See application file for complete search history.

(56) References Cited

U.S. PATENT DOCUMENTS

| | | | | |
|---|---|---|---|---|
| 6,205,150 | B1 * | 3/2001 | Ruszczyk | .............. H04L 47/58 370/429 |
| 10,771,524 | B1 * | 9/2020 | Long | .................... H04L 67/568 |
| 2010/0235438 | A1 | 9/2010 | Narayanan et al. | |

| | | | | |
|---|---|---|---|---|
| 2010/0235472 | A1 * | 9/2010 | Sood | ....................... H04L 67/06 709/224 |
| 2011/0093905 | A1 * | 4/2011 | McKinley | ........... H04N 21/222 725/92 |
| 2011/0129201 | A1 * | 6/2011 | McLean | ............. H04N 21/4532 386/296 |
| 2018/0192087 | A1 * | 7/2018 | Dudko | ................. H04N 21/814 |
| 2021/0227264 | A1 | 7/2021 | Ra et al. | |
| 2023/0099433 | A1 | 3/2023 | Gupta et al. | |

FOREIGN PATENT DOCUMENTS

| | | | | |
|---|---|---|---|---|
| CN | 112860185 A | * | 5/2021 | ............... G06F 3/06 |

OTHER PUBLICATIONS

International Search Report for Application No. PCT/US2024/022635 dated Jun. 19, 2024.
Hasslinger et al., "An Overview of Analysis Methods and Evaluation Results for Caching Strategies", Computer Networks, DOI: 10.1016/J.COMNET.2023.109583, vol. 228, Jan. 17, 2023, pp. 1-21.

* cited by examiner

*Primary Examiner* — Jason K Lin

(74) *Attorney, Agent, or Firm* — Artegis Law Group, LLP

(57) ABSTRACT

In various embodiments, a live event caching application caches segments that are associated with live events. At a first point-in-time, the live event caching application stores a segment of a downloadable that is associated with a live event in a high priority list. At a second point-in-time, the live event caching application determines that the segment is at a tail of the high priority list, where the second point-in-time is subsequent to the first point-in-time. Upon determining that the segment is at the tail of the high priority list, further determining that an age of the segment is greater than a cutoff threshold. In response to determining that the age of the segment is greater than the cutoff threshold, moving the segment from the high priority list to a low priority list.

20 Claims, 5 Drawing Sheets

Figure 2:
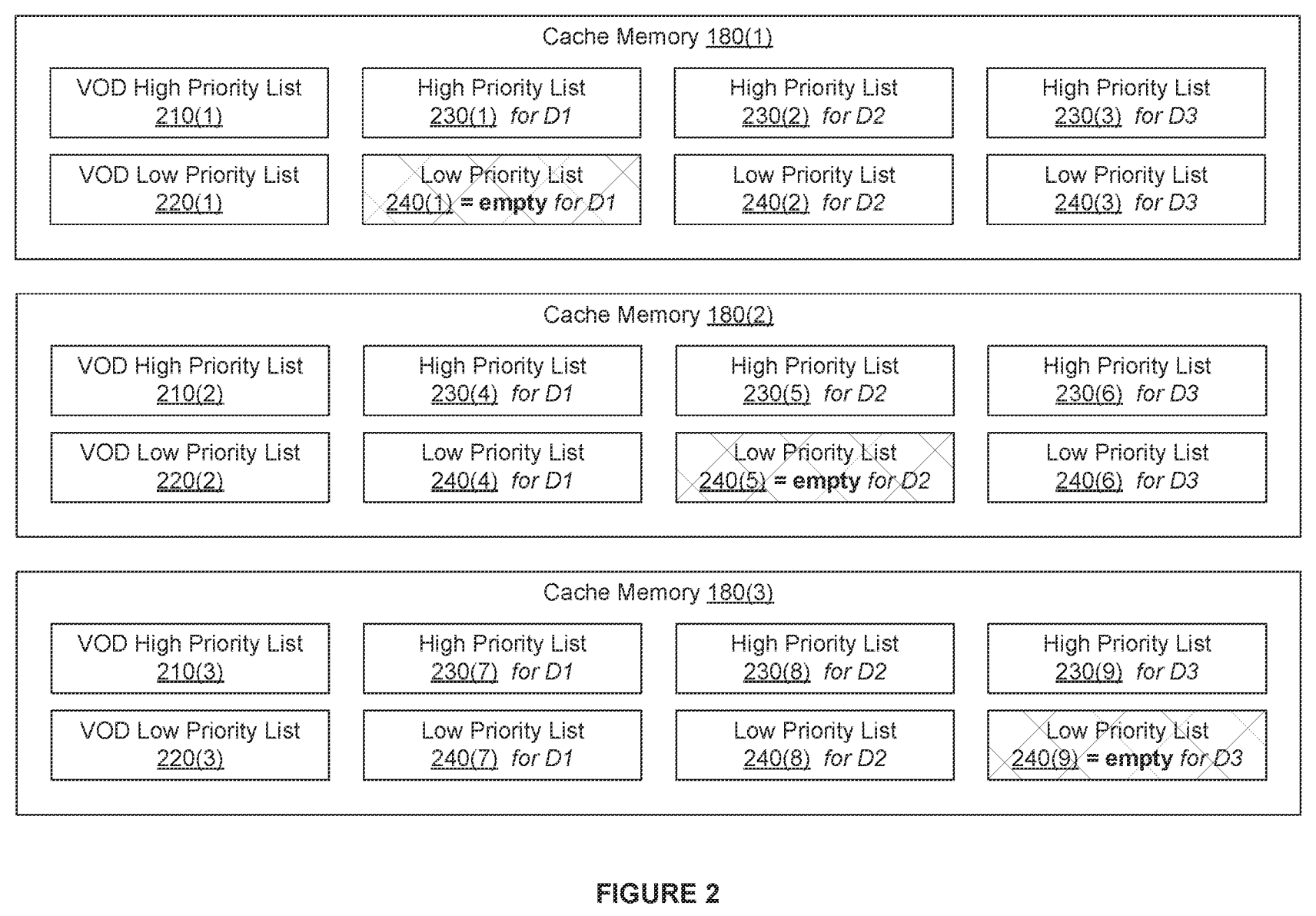

Cache Memory 180(1)

VOD High Priority List 210(1)

VOD Low Priority List 220(1)

High Priority List 230(1) *for D1*

Low Priority List 240(1) = empty *for D1*

High Priority List 230(2) *for D2*

Low Priority List 240(2) *for D2*

High Priority List 230(3) *for D3*

Low Priority List 240(3) *for D3*

Cache Memory 180(2)

VOD High Priority List 210(2)

VOD Low Priority List 220(2)

High Priority List 230(4) *for D1*

Low Priority List 240(4) *for D1*

High Priority List 230(5) *for D2*

Low Priority List 240(5) = empty *for D2*

High Priority List 230(6) *for D3*

Low Priority List 240(6) *for D3*

Cache Memory 180(3)

VOD High Priority List 210(3)

VOD Low Priority List 220(3)

High Priority List 230(7) *for D1*

Low Priority List 240(7) *for D1*

High Priority List 230(8) *for D2*

Low Priority List 240(8) *for D2*

High Priority List 230(9) *for D3*

Low Priority List 240(9) = empty *for D3*

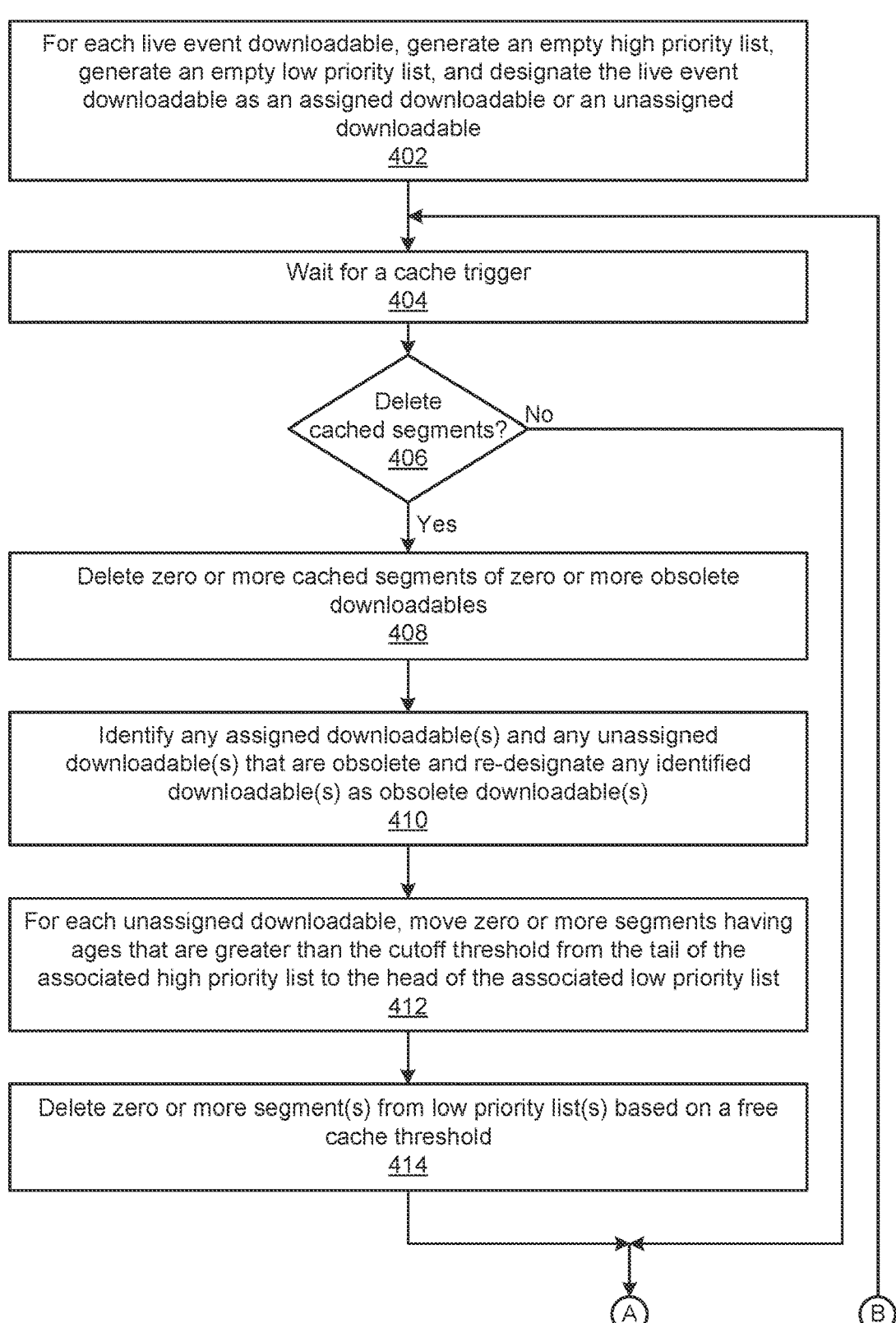

For each live event downloadable, generate an empty high priority list, generate an empty low priority list, and designate the live event downloadable as an assigned downloadable or an unassigned downloadable
402

Wait for a cache trigger
404

Delete cached segments?
406

No

Yes

Delete zero or more cached segments of zero or more obsolete downloadables
408

Identify any assigned downloadable(s) and any unassigned downloadable(s) that are obsolete and re-designate any identified downloadable(s) as obsolete downloadable(s)
410

For each unassigned downloadable, move zero or more segments having ages that are greater than the cutoff threshold from the tail of the associated high priority list to the head of the associated low priority list
412

Delete zero or more segment(s) from low priority list(s) based on a free cache threshold
414

TECHNIQUES FOR CACHING MEDIA CONTENT WHEN STREAMING LIVE EVENTS

BACKGROUND

Field of the Various Embodiments

The various embodiments relate generally to computer science and to media streaming technology and, more specifically, to techniques for caching media content when streaming live events.

Description of the Related Art

In some approaches to streaming media content to end-point devices, each media source is encoded based on different sets of encoding parameters to generate multiple encoded versions of the media source, where each encoded version of each media source is known as a "downloadable." The downloadables are partitioned into segments, and those segments are stored in an origin server and subsequently streamed to various client devices, on-demand, via a content delivery network (CDN). In some implementations, a CDN includes multiple distribution centers, where each distribution center is associated with a different geographical region and includes one or more edge servers. Each edge server caches and delivers segments to the client devices in the associated geographical region on behalf of the origin server. When an edge server receives a request from a client device for a segment, the edge server transmits the segment directly to the client device if the edge server already has the segment stored in cache memory. Otherwise, the edge server downloads the segment from the origin server, transmits the segment to the client device, and optionally stores the segment in cache memory. Because each edge server has a limited amount of cache memory, each edge server typically implements one or more strategies to selectively cache different segments.

One approach to caching segments involves downloading a segment from the origin server to an edge server, where the edge server then stores the segment at the head of a list. When responding to a request for a segment that is cached in the list, the edge server moves the corresponding segment forward within the list to the head of the list. Periodically, the edge server executes a least-recently-used (LRU) algorithm that determines whether to delete segments from the list based on the amount of free cache memory within the edge server. If the amount of free cache memory is less than a free cache threshold, then the LRU algorithm deletes one or more segments at the tail of the list to increase the amount of free cache memory. In this fashion, the LRU algorithm deletes the segment(s) that were accessed least recently or furthest in the past.

One drawback of the above approach is that, in the context of streaming a live event, discarding different segments based on when those segments were accessed last does not necessarily correlate to the benefits of retaining certain segments in cache memory. More particularly, if all relevant downloaded segments of downloadables associated with a live event or "live event downloadables" are not cached by an edge server and made available to a client device, then providing the client device with scrubbing functionality, such as rewind, pause, and fast forward, during the live event can be problematic. For example, to enable proper rewind capability during a live event, an edge server would likely have to re-download numerous segments of a live event downloadable from the origin server so that all relevant segments are available to a client device to allow the client device to rewind back through the live event. Re-downloading numerous segments in such a fashion can cause the associated upstream network link to become saturated, which can reduce the ability of the edge server to provide un-cached segments of downloadables to the client device and to any other client devices. Without efficient access to un-cached segments, the overall viewing experiences for the users of the client devices can be substantially reduced.

Another approach to caching segments of downloadables involves an edge server implementing multiple separate lists (e.g., queues) to store different types of content, where the edge server stores segments to and deletes segments from a given list using a caching strategy that is tailored to the type of content stored in the given list. In such an implementation, an edge server may allocate a high priority list for segments of live event downloadables and one or more lower priority lists for all other segments. When a segment of a live event downloadable is received from the origin server, the edge server stores the segment at the head of the high priority list. The edge server stores all segments of each live event downloadable in the high priority list until the live event downloadable is deemed obsolete (e.g., when the associated live event ends). One drawback of this approach is that a prohibitively large amount of cache memory is needed to ensure that all segments of all live event downloadables that are not deemed obsolete can be simultaneously stored in the high priority list.

As the foregoing illustrates, what is needed in the art are more effective techniques for caching segments of live event downloadables.

SUMMARY

One embodiment sets forth a computer-implemented method for caching segments associated with live events that is implemented by a computer device. The method includes, at a first point-in-time, storing a first segment of a first downloadable that is associated with a first live event in a first high priority list; at a second point-in-time, determining that the first segment is at a tail of the first high priority list, where the second point-in-time is subsequent to the first point-in-time; upon determining that the first segment is at the tail of the first high priority list, further determining that an age of the first segment is greater than a cutoff threshold; and in response to determining that the age of the first segment is greater than the cutoff threshold, moving the first segment from the first high priority list to a first low priority list.

At least one technical advantage of the disclosed techniques relative to the prior art is that, with the disclosed techniques, an edge server caches all segments of each live event downloadable that is assigned to the edge server as well as recent segments of other live event downloadables in high priority lists, where the age of each recent segment is not greater than a cutoff threshold. Thus, with the disclosed techniques, the edge server can move a segment of any live event downloadable that is not assigned to the edge server from a high priority list to a low priority list once the age of the segment is greater than the cutoff threshold Further, with the disclosed techniques, edge servers can delete segments from low priority lists as-needed to increase the amount of free cache memory. Consequently, with the disclosed techniques, the total amount of cache memory allocated within an edge server of a CDN for streaming live events and for providing related scrubbing functionality can be more effectively controlled and maintained relative to what can be achieved using prior art techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 is a more detailed illustration of the cache memories of FIG. 1, according to various embodiments;

FIGS. 4A-4B set forth a flow diagram of method steps for caching segments of live event downloadables, according to various embodiments.

DETAILED DESCRIPTION

Figure 1:
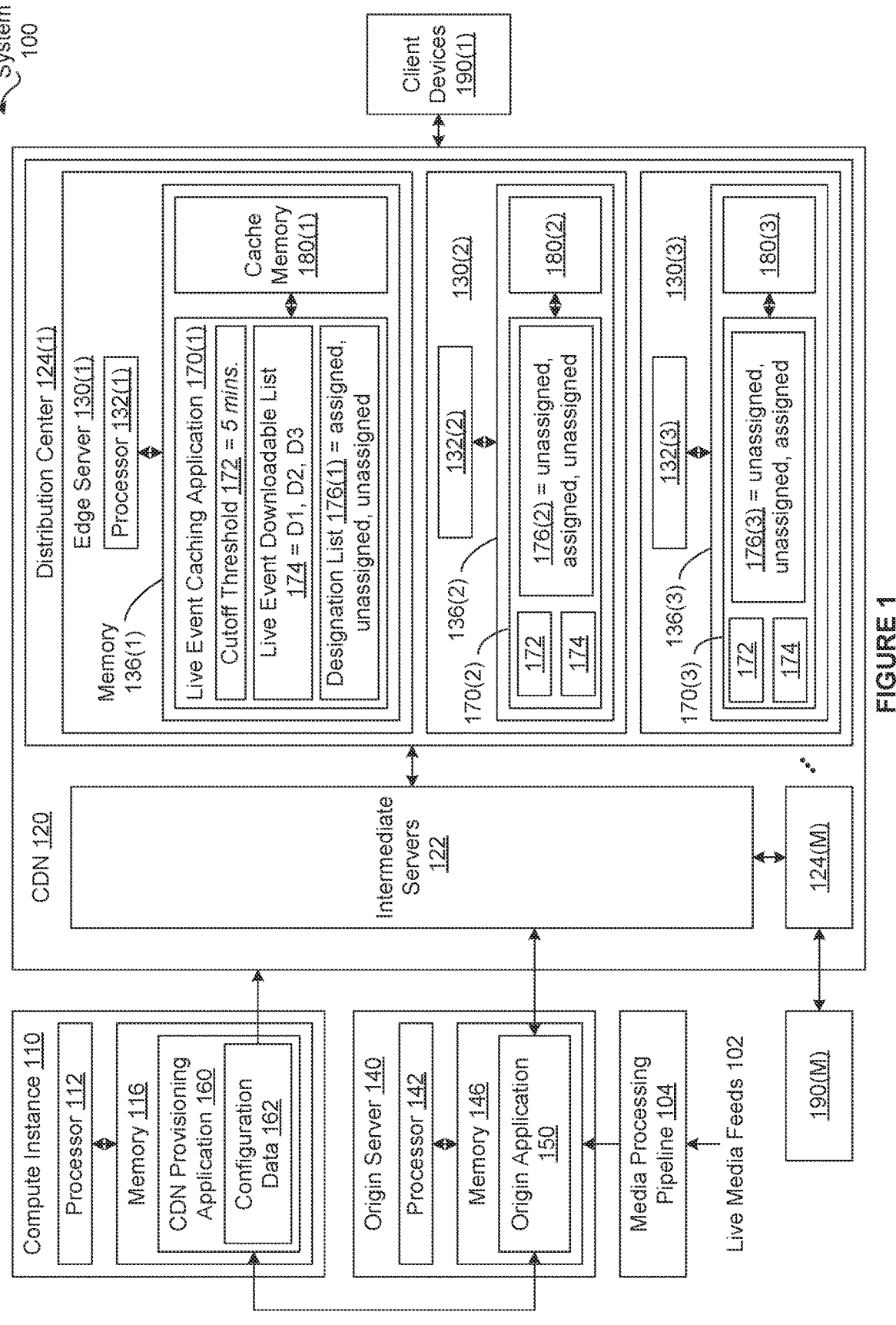
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

To stream a live event in real-time to a variety of different client devices, a typical media service provider encodes each of one or more live media feeds (e.g., video feeds from different cameras, audio feeds from different microphones, etc.) across a variety of different encoding parameters. The resulting live event downloadables are associated with different combinations of bitrates and resolutions. Notably, a live event downloadable having a given bitrate can usually be streamed to a client device without playback interruptions when the network throughput is greater than or equal to that bitrate. As different segments of live event downloadables are generated, the segments are stored in an origin server and distributed to a CDN on-demand.

In some implementations, a CDN includes multiple distribution centers, where each distribution center is associated with a different geographical region and includes one or more edge servers. In response to requests from client devices in the associated geographical region, each edge server downloads from the origin server, caches, and delivers requested segments of live downloadables as well as video-on-demand (VOD) downloadables to the client devices. VOD downloadables are encoded versions of pre-recorded media content, such as feature-length movies. Because each edge server has a limited amount of cache memory, each edge server typically implements one or more strategies to selectively cache different segments.

In some implementations, upon receiving a segment from the CDN, an edge server stores the segment in a single list that is stored in the associated cache memory. Periodically as the cache memory fills up, the edge server deletes the segment(s) that were accessed least recently or furthest in the past from the list to increase the amount of free cache memory. One drawback of this approach is that unless all segments of a live event downloadable are stored in cache memory, then providing client devices with scrubbing functionality, such as rewind, pause, and fast forward, during the associated live event can be problematic.

In some other implementations, each edge server uses the above approach to selectively cache segments of each VOD deliverable. By contrast, each edge server caches all segments of each live event deliverable in a high priority list stored in the associated cache memory until at least the live event completes. One drawback of this approach is that a prohibitively large amount of cache memory is needed to ensure that all segments of all live event downloadables that are associated with in-progress live events can be simultaneously stored in the high priority list.

With the disclosed techniques, however, each edge server can cache segments of VOD downloadables in any technically feasible fashion (e.g. as described above). By contrast, a different instance of a live event caching application executes on each edge server. The live event caching application caches segments of live event downloadables based on assignments of live event downloadables to edge servers and the ages of segments of live event downloadables relative to a cutoff threshold.

The instance of a live event caching application executing on each edge server assigns each live event downloadable to a single edge server in each distribution center in a consistent fashion. If a live event downloadable is assigned to an edge server, then the instance of the live event caching application executing on the edge server caches all downloaded segments of the live event downloadable in an associated high priority list. The associated high priority list is dedicated solely to the live event downloadable and is included in the cache memory within the edge server. The instance of the live event caching application does not delete any segments from the high priority list until at least the associated live event is complete.

If, however, a live event downloadable is not assigned to an edge server, then upon receiving a segment of the live event downloadable from the CDN, the instance of the live event caching application executing on the edge server stores the segment in one of two lists. If the age of the segment is less than a cutoff threshold, then the instance of the live event caching application stores the segment in a high priority list that is dedicated solely to the live event downloadable and is included in the cache memory within the edge server. Otherwise, the instance of the live event caching application stores the segment in a low priority list that is dedicated solely to the live event downloadable and is included in the cache memory within the edge server. The instance of the live event caching application can move segments from the high priority list to the low priority list when the ages of the segments are greater than the cutoff threshold. And the live event caching application can delete segments from the low priority list as-needed. As used herein, an age of a given segment is equal to a difference between a creation or modification time associated with the given segment and a current time.

At least one technical advantage of the disclosed techniques relative to the prior art is that the responsibility for storing all segments of the live event downloadables in order to provide full scrubbing functionality during the associated events is distributed across the edge servers in each distribution center. Consequently, the amount of cache memory that each edge server requires can be substantially decreased relative to prior art techniques without sacrificing scrubbing functionality. These technical advantages provide one or more technical advancements over prior art approaches.

System Overview

FIG. 1 is a conceptual illustration of a system 100 configured to implement one or more aspects of the various embodiments. As shown, in some embodiments, the system 100 includes, without limitation, a compute instance 110, a CDN 120, a media processing pipeline 104, an origin server 140, and client devices 190(1)—client devices 190(M), where M can be any positive integer.

In some other embodiments, the system 100 can omit one or more of the compute instance 110, the media processing pipeline 104, the origin server 140, one or more of the client devices 190(1)—client devices 190(M), or any combination thereof. In the same or other embodiments, the system 100 can further include, without limitation, one or more other compute instances, one or more other CDNs, one or more other media processing pipelines, one or more other origin servers, or any combination thereof.

Any number of the components of the system 100 can be distributed across multiple geographic locations or implemented in one or more cloud computing environments (e.g., encapsulated shared resources, software, data) in any combination. In some embodiments, the compute instance 110 and/or zero or more other compute instances can be implemented in a cloud computing environment, implemented as part of any other distributed computing environment, or implemented in a stand-alone fashion.

As shown, the compute instance 110 includes, without limitation, a processor 112 and a memory 116. In some embodiments, each of any number of other compute instances can include any number of other processors and any number of other memories in any combination. In particular, the compute instance 110 and/or one or more other compute instances can provide a multiprocessing environment in any technically feasible fashion. Any number (including all or none) of compute instances in the system 100 are also computer devices.

The processor 112 can be any instruction execution system, apparatus, or device capable of executing instructions. For example, the processor 112 could comprise a central processing unit, a graphics processing unit, a controller, a microcontroller, a state machine, or any combination thereof. The memory 116 stores content, such as software applications and data, for use by the processor 112.

The memory 116 can be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

The origin server 140 and zero or more other origin servers (not shown) are different compute instances. As shown, the origin server includes, without limitation, a processor 142 and a memory 146. The processor 142 can be any instruction execution system, apparatus, or device capable of executing instructions. The memory 146 stores content, such as software applications and data for use by the processor 142. The memory 146 can be one or more of a readily available memory, such as random-access memory, read only memory, floppy disk, hard disk, or any other form of digital storage, local or remote. In some embodiments, a storage (not shown) may supplement or replace the memory 146. The storage may include any number and type of external memories that are accessible to the processor 142 of the origin server 140.

In particular, the origin server 140 and zero or more other origin servers collectively store at least one copy of each of any number of downloadables for streaming to any number of client devices via the CDN 120. As referred to herein, a "downloadable" is an encoded version of any type of media content. Some examples of different types of media content are video, audio, and subtitles. The media content can be delivered in real-time via live media feeds 102 associated with any number and/or types of live events or can be stored in source files associated with any number and/or types of media titles.

Downloadables associated with live events are also referred to herein as "live event downloadables." Some examples of live events are a live sporting event, a live television show, a live performance, a live speech, and a live meeting. Each live event can be associated with any number of different live media feeds, where each live media feed is associated with a different source (e.g., a different camera).

Downloadables derived from source files are also referred to herein as "video on demand" or "VOD" downloadables. Some examples of media titles are feature-length films, episodes of prerecorded television programs, music videos, and podcasts, to name a few. Each downloadable includes, without limitation, a sequence of one or more discrete, time-based segments that correspond (in a playback timeline) to a sequence of one or more discrete source segments of the associated source. For explanatory purposes, a "segment" as used herein refers to a segment of a downloadable.

The media processing pipeline 104 generates any number of live event downloadables based on the live media feeds 102. The media processing pipeline 104 encodes each of the live media feeds 102 in real-time across different sets of encoding parameters to incrementally generate different downloadables having different combinations of resolutions and bitrates. Accordingly, a different portion of a live video feed, a live audio feed, a live subtitle feed, or any type of other media feed is encoded to generate each segment of a live event downloadable. In some embodiments, the media processing pipeline 104 independently encodes each portion of a live video feed to ensure that each corresponding segment can be decoded independently of any other segments. Ensuring that each segment can be independently decoded enables endpoint applications to switch between downloadables generated based on the same live media feed at segment boundaries during playback. As new segments of live event downloadables are generated, the segments are stored on the origin server 140.

In some embodiments, the media processing pipeline 104 and/or any number of other media processing pipelines can generate any number and/or types of live event downloadables based on any number and/or types of live media feeds, any number of VOD downloadables based on any number and/or types of source files, or any combination thereof. As new segments of live event downloadables are generated, the segments are stored on the origin server 140. At any time after each segment of each VOD downloadable is generated, the segment can be stored on the origin server 140.

In general, each compute instance (including the compute instance 110 and the origin server 140) is configured to implement one or more software applications. For explanatory purposes, each software application is described as residing in the memory of a single compute instance and executing on the processor of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

As shown, a CDN provisioning application 160 resides in the memory 116 of the compute instance 110 and executes on the processor 112 of the compute instance 110. An origin application 150 resides in the memory 146 of the origin server 140 and executes on the processor 142 of the origin server 140. The CDN provisioning application 160 interacts with any number of users in any technically feasible fashion (e.g., via a graphical user interface (GUI) or any other user interface), the origin application 150, and the CDN 120. The CDN provisioning application 160 configures the CDN 120 to deliver downloadables on behalf of the origin application 150 to client devices 190(1)—client devices 190(M). The CDN provisioning application 160 can interact with any number of users in any technically feasible fashion and/or the origin application 150 to determine any amount and/or types of relevant data. The origin application 150 provides any amount and/or types of data to the CDN provisioning application 160 and provides segments of downloadables on-demand to the CDN 120. Segment(s) of a given downloadable are also referred to herein as segment(s) associated with the given downloadable.

As shown, the CDN 120 includes, without limitation, intermediate servers 122 and a distribution center 124(1)—a distribution center 124(M), where M can be any positive integer. Each of the distribution center 124(1)—a distribution center 124(M) includes a group or cluster of one or more edge servers that are physically and/or logical grouped together and provide segments of downloadables to, respectively, client devices 190(1)—client devices 190(M). For instance, in some embodiments, each of the distribution center 124(1)—a distribution center 124(M) is associated with a different geographical region and includes a different cluster of edge servers that are in the associated geographical region. In the same or other embodiments, the client devices 190(1)—the client devices 190(M) are located in the same geographical region as, respectively, the distribution center 124(1)—a distribution center 124(M). In some other embodiments, each of the distribution center 124(1)—a distribution center 124(M) is associated with a different company and includes a different cluster of edge servers that are dedicates to, respectively, the client devices 190(1)—the client devices 190(M) belong to the associated company.

Each of the client devices 190(1)—the client devices 190(M) is a different group of one or more client devices, where each client device is capable of requesting, decoding, and playing back segments of downloadables. In some embodiments, one or more compute instances can be integrated with any number and/or types of other devices (e.g., a display device) into a client device. Some examples of client devices include, without limitation, desktop computers, laptops, smartphones, smart televisions, game consoles, tablets, and set-top boxes.

In many implementations, to stream a live event in real-time, a client device executes a playback application that transmits a sequence of requests to an edge server that is included in the CDN 120 and resides in the distribution center associated with the client device. For each such request, if the edge server has a copy of the requested segment stored in an associated cache memory, then a "cache hit" occurs, and the edge server transmits the requested segment to the playback application. Otherwise, a "cache miss" occurs, and the edge server retrieves the requested encoded segment from one of the intermediate servers 122 or the origin server 140. Importantly, because each edge server has a limited amount of cache memory, each edge server typically implements one or more strategies to selectively cache different segments.

As described previously herein, one approach to caching segments involves downloading a segment from the origin server to an edge server, where the edge server then stores the segment at the head of a list. When responding to a request for a segment that is cached in the list, the edge server moves the corresponding segment forward within the list to the head of the list. Periodically and/or when the amount of associated free cache memory is less than a free cache threshold, the edge server deletes one or more segments at the tail of the list to increase the amount of free cache memory. In this fashion, the edge server deletes the segment(s) that were accessed least recently or furthest in the past.

One drawback of the above approach is that, in the context of streaming a live event, discarding different segments based on when those segments were accessed last does not necessarily correlate to the benefits of retaining certain segments in cache memory. More particularly, if all relevant downloaded segments of downloadables associated with a live event or "live event downloadables" are not cached by an edge server and made available to a client device, then providing the client device with scrubbing functionality can be problematic. Segment(s) of downloadale(s) associated with a given live event are also referred to herein as segments(s) associated with the given live event.

Another approach to caching segments of downloadables involves an edge server allocating a high priority list for segments of live event downloadables and one or more lower priority lists for all other segments. The edge server stores all segments of each live event downloadable in the high priority list until the live event downloadable is deemed obsolete. One drawback of this approach is that a prohibitively large amount of cache memory is needed to ensure that all segments of all live event downloadables that are not deemed obsolete can be simultaneously stored in the high priority list.

Caching Segments of Live Event Downloadables Based on Age

To address the above problems, the system 100 includes, without limitation, a VOD caching application (not shown) and a live event caching application 170 (not explicitly shown) that collectively implement different caching strategies for VOD downloadables, near-live segments of live event downloadables, and other segments of live event downloadables. As referred to here, the "near-live" segments of a live event downloadable have creation times that are within a specified amount of time of the current time. In some embodiments, the near-live segments of a live event downloadable are the segments of the live event downloadable that are within a cutoff threshold 172 (e.g., five minutes) of a current time. Accordingly, a near-live segment of a downloadable has a creation time such that the sum of the creation time and the cutoff threshold 172 is not earlier than the current time.

The live event caching application 170 can determine a creation time of a segment in any technically feasible fashion. For instance, in some embodiments, the live event caching application 170 sets the creation time based on a last modified date and time specified in a last-modified response Hypertext Transfer Protocol header generated by the origin server 140 when sending the segment to the CDN 120. Typically, the creation time approximately corresponds to the time at which the media processing pipeline 104 generated the segment.

As time passes, the current time increases and the age of a segment that was previously near-live becomes greater than the cutoff threshold 172, and the segment is no longer designated as a near-live segment. For instance, if the cutoff threshold 172 is five minutes, then only the segments of each live event downloadable corresponding to the most recent five minutes of the associated live event are considered near-live segments at any given point-in-time.

In some embodiments, the CDN provisioning application 160 or the live event caching application 170 assigns each live event downloadable to a single edge server in each distribution center. An edge server is responsible for caching and providing all segments of each live event downloadable that is assigned to the edge server. By contrast, an edge server is responsible for caching and providing only the near-live segments of each live event downloadable that is not assigned to the edge server. As used herein, if a live event downloadable is assigned to an edge server, then the edge server is assigned to the live event downloadable. But if a live event downloadable is not assigned to an edge server, then the edge server is not assigned to the live event downloadable.

Accordingly, each client device of a given distribution center can stream the near-live segments of a live event downloadable from any edge server in the distribution center. By contrast, each client device of a given distribution center can stream older segments of the live event downloadable from any of the one or more edge servers in the distribution center that are assigned to the live event downloadable in order to access scrubbing functionality for the live event downloadable. In that regard, for at least a short time after a live event completes, each edge server that is assigned to a live event downloadable associated with the live event stores segments of the live event downloadable in a high priority list, where the segments span a duration of the live event.

After the age of a cached segment of a live event downloadable is greater than the cutoff threshold 172, edge servers that are not assigned the live event downloadable can delete the cached segment from associated cache memories in accordance with any number and/or types of removal strategies. After a live event downloadable has become obsolete, edge servers that are assigned the live event downloadable across any number of distribution centers can delete the cached segments for the live event downloadable in accordance with any number and/or types of removal strategies. A live event downloadable can be designated as "obsolete" in any technically feasible fashion based on any number and/or types of criteria. For instance, in some embodiments, a live event downloadable is designated as obsolete after an associated live event is over and a VOD version of the live event downloadable is available.

As shown, the CDN provisioning application 160 generates, updates, and provides configuration data 162 to each edge server in the CDN 120. The configuration data 162 specifies, without limitation, the cutoff threshold 172, identifies each live event downloadable, and specifies a status and any number (including none) of other characteristics for each live event downloadable. The CDN provisioning application 160 can generate, update, and provide the configuration data 162 to each edge server in any technically feasible fashion.

In some embodiments, the CDN provisioning application 160 determines the cutoff threshold 172 based on a default cutoff threshold that can be overridden by user input received in any technically feasible fashion (e.g., via an associated GUI or other user interface). The CDN provisioning application 160 automatically generates a unique identifier for each live event downloadable that is specified via user input or in any other technically feasible fashion. The CDN provisioning application 160 determines the status (e.g., active, inactive, obsolete) of each live event downloadable based on user input and/or data received from the origin application 150.

A status of active for a live event downloadable indicates that a live event associated with the live event downloadable is in progress A status of inactive for a live event downloadable indicates that a live event associated with the live event downloadable is not in progress. A status of obsolete indicates that the segments of a live event downloadable can be deleted (e.g., because the associated live event is complete and a VOD version of the live event downloadable is available).

For each of the live event downloadables, the CDN provisioning application 160 or the live event caching application 170 distributes or "shards" assignments for the live event downloadables across the edge servers in each distribution center. For instance, suppose that the total number of live event downloadables was thirty, a first distribution center included five edge servers, and a second distribution center included ten edge servers. In such a scenario, the CDN provisioning application 160 or the live event caching application 170 would assign six different live event downloadables to each edge server in the first distribution center. And the CDN provisioning application 160 or the live event caching application 170 would assign three different live event downloadables to each edge server in the second distribution center. The CDN provisioning application 160 or the live event caching application 170 can distribute assignments for the live event downloadables across the edge servers in each distribution center in any technically feasible fashion.

For instance, in some embodiments, the CDN provisioning application 160 or the live event caching application 170 maps each identifier for a live event downloadables to a hash (e.g., an integer) via a consistent hash function. The CDN provisioning application 160 or the live event caching application 170 then computes a hash modulo of the total number of edge servers included in a given distribution center to determine a server number within the distribution center. More precisely, for a distribution center that includes S edge servers and a live event downloadable having an numerical ID denoted EID, the CDN provisioning application 160 or the live event caching application 170 sets an assigned server number equal to "hash (EID) mod S". The assigned server number identifies the edge server within the distribution center that is assigned to the live event downloadable.

The CDN provisioning application 160 can store any amount of the configuration data 162 in any type of memory that can be accessed by the edge servers, transmit any amount of the configuration data 162 to the CDN 120 for propagation through the intermediate servers 122 to the edge servers, transmit any amount of the configuration data 162 directly to each edge server, or any combination thereof.

In general, a different instance of the live event caching application 170 executes on each edge server included in the CDN 120. Each instance of the live event caching application 170 applies the temporal-based caching strategies as described herein to segments of live event downloadables downloaded to the associated edge server and the cache memory of the associated edge server. As used herein, "temporal-based caching strategies" refers to techniques used to selectively store segments of live event downloadables in cache memory, move segments of live event downloadables within cache memory, and delete cached segments of live event downloadables from cache memory based, at least in part, on the ages of the segments relative to the cutoff threshold 172.

Each instance of the live event caching application 170 independently performs the same operations based on the configuration data 162 to determine the cutoff threshold 172 and determine and update a live event downloadable list 174. Consequently, the cutoff threshold 172 and the live event downloadable list 174 do not vary across the instances of the live event caching application 170 executing in a given distribution center. The value for the cutoff threshold 172 is an amount of time or a "time duration" (e.g., five minutes). The live event downloadable list 174 is a list of identifiers for any number of live event downloadables and can be specified in any technically feasible fashion.

Each instance of the live event caching application 170 determines a different designation list based on the configuration data 162 and a unique identifier for the associated edge server. For each live event downloadable identified in the live event downloadable list 174, the designation list designates each live event downloadable as an assigned downloadable for the associated edge server, an unassigned downloadable for the associated edge server, or an obsolete downloadable.

For explanatory purposes, as used herein, if a live event downloadable is assigned to an edge server, then the live event downloadable is also referred to herein as an "assigned downloadable" for the edge server and for the instance of the live event caching application 170 that is associated with the edge server. Furthermore, segments of an assigned downloadable are also referred to herein as "assigned segments." By contrast, if a live event downloadable is not assigned to an edge server, then the live event downloadable is also referred to herein as an "unassigned downloadable" for the edge server and for the instance of the live event caching application 170 that is associated with the edge server. Furthermore, segments of an unassigned downloadable are also referred to herein as "unassigned segments." If a live event downloadable becomes obsolete (e.g., is inactive and a VOD version of the live event downloadable is available), then the live event downloadable is referred to herein as an "obsolete downloadable."

Each instance of the live event caching application 170 allocates and uses a different pair of lists in the associated cache memory to cache segments of each live event downloadable. Each pair of lists includes a high priority list and a low priority list. Accordingly, each live event downloadable is associated with a high priority list that is dedicated solely to segments of the live event downloadable and a low priority list that is dedicated solely to segments of live event downloadable. Each of the high priority list and the low priority list can be implemented in any technically feasible fashion. For example, in some embodiments, each high priority list and each low priority list is a queue or a double-linked list.

As described previously herein, the live event caching application 170 stores each downloaded segment of an assigned downloadable in the high priority list for the assigned downloadable until at least the associated live event is complete or the live event caching application 170 re-designates the assigned downloadable as an obsolete downloadable. The low priority list for an assigned downloadable is not used. In some embodiments, the low priority list for an assigned downloadable is omitted. By contrast, the live event caching application 170 stores each downloaded segment of an unassigned downloadable that is near-live in the high priority list for the unassigned downloadable and optionally stores older downloaded segments for the unassigned downloadable in the low priority list for the unassigned downloadable. As used herein a "downloaded segment" refers to a segment of a live event downloadable that an instance of the live event caching application 170 receives from the origin server 140 or one of the intermediate servers 122 in response to a request for the segment from a client device.

Each instance of the live event caching application 170 updates any number of pairs of lists for the live event downloadables based on any number and/or types of cache triggers. Some examples of cache triggers are an internally or externally generated request to delete segment(s) of downloadable(s) stored in the associated cache memory, receiving a downloaded segment of a live event downloadable, and receiving a request from a client device for a segment of a live event downloadable that is stored in the associated cache memory. As used herein, a segment of a live event downloadable that is stored in a cache memory is also referred to herein as a "cached segment." And "receiving a downloaded segment" refers to receiving a segment of a live event downloadable from the origin server 140 or one of the intermediate servers 122 in response to a request for the segment from a client device.

In response to a cache trigger that is a request to delete cached segment(s) and optionally as part of a response to any other cache trigger, the live event caching application 170 executes a removal process in order to increase the amount of associated free cache memory. A request to delete cached segment(s) can be generated in any technically feasible fashion by the live event caching application 170 or any other software application (e.g., the CDN provisioning application 160). For instance, in some embodiments, the live event caching application 170 periodically generates a request to delete cached segment(s). In the same or other embodiments, if the amount of associated free cache memory is less than a free cache threshold then the live event caching application 170 generates a request to delete cached segment(s).

The live event caching application 170 can determine whether to execute an optional removal process based on any number and/or types of criteria. For instance, in response to a cache trigger corresponding to receiving a downloaded segment of a live event deliverable, the live event caching application 170 could optionally execute the removal process based on the size of the downloaded segment. If, the amount of associated free cache memory is less than the sum of a free cache threshold and the size of the downloaded segment, then the live event caching application 170 would execute the removal process. Otherwise, the live event caching application 170 would not execute the removal process.

During the removal process, the live event caching application 170 deletes zero or more cached segments of zero or more obsolete downloadables from the associated cache memory. The live event caching application 170 then identifies any of the assigned downloadable(s) and any unassigned downloadable(s) that are obsolete and re-designates any identified downloadable(s) as obsolete downloadable(s). Importantly, for each unassigned downloadable, the live event caching application 170 moves zero or more segments that are older than a cutoff threshold from the tail of the associated high priority list to the head of the associated low priority list. The live event caching application 170 can optionally delete segment(s) from low priority list(s) as-needed.

Upon receiving a downloaded segment of a live event downloadable, the live event caching application 170 optionally executes the removal process described above. Subsequently, if the live event downloadable is assigned to the associated edge server, then the live event caching application 170 stores the downloaded segment at the head of the associated high priority list.

If, however, if the live event downloadable is not assigned to the associated edge server, then the live event caching application 170 determines whether the downloaded segment is near-live. If the downloaded segment is near-live, then the live event caching application 170 stores the downloaded segment at the head of the associated high priority list. Otherwise, the live event caching application 170 stores the downloaded segment at the head of the associated low priority list.

Upon receiving a request from a client device for a segment of a live event downloadable that is stored in the associated cache memory, the live event caching application 170 optionally executes the removal process described above. Subsequently, if the live event downloadable is assigned to the associated edge server or the segment is near-live, then the live event caching application moves the segment to the head of the associated high priority list. If, however, the live event downloadable is not assigned to the associated edge server and the segment is not near-live, then the live event caching application 170 moves the segment from a current location in either the associated low priority list or the associated high priority list to the head of the associated high priority list.

Please note that many modifications and variations on the functionality of the live event caching application 170, the CDN provisioning application 160, the origin application 150, and the VOD caching application as described herein will be apparent to those of ordinary skill in the art without departing from the scope and spirit of the described embodiments. For instance, in some other embodiments, each instance of the live event caching application 170 can apply the temporal-based caching strategies as described herein to some live event downloadables and not to other live event downloadables. In the same or other embodiments, any number and/or types of caching applications can apply any number and/or types of caching strategies to any number and/or types of other downloadables (e.g., VOD downloadables and/or other live event downloadables).

In some other embodiments, the live event caching application 170 or the CDN provisioning application 160 can assign more than one edge server in a given distribution center to a given live event downloadable. In the same or other embodiments, the live event caching application 170 or the CDN provisioning application 160 can determine any number of cutoff threshold(s) instead of or in addition to the cutoff threshold 172. Cutoff thresholds can therefore vary across live event downloadables and/or distribution centers in any technically feasible fashion.

For explanatory purposes, temporal-based caching strategies and associated functionality implemented by the live event caching application 170 are depicted in and described below in conjunction with FIGS. 1-3 in the context of the distribution center 124(1) that includes three different edge servers, the live event downloadable list 174 that specifies three different live event downloadables (denoted as D1, D2, and D3), and the cutoff threshold 172.

As shown, the distribution center 124(1) is an exemplar distribution center that includes, without limitation, an edge server 130(1)—an edge server 130(3). The live event downloadable list 174 is an exemplar list of live event downloadables that identifies three different exemplar live event downloadables that are denoted herein as D1, D2, and D3. The live event downloadables specified in the live event downloadable list 174 can be derived from the same live feed of the same live event, different live feeds of the same live event, different live feeds of different live events, or any combination thereof.

Please note, however, the techniques described herein are illustrative rather than restrictive and can be implemented within any number of distribution centers and applied to any number of live event downloadables without departing from the broader spirit and scope of the embodiments. More generally, the techniques described herein in conjunction with FIGS. 1-3 can be implemented within any number of distribution centers that each access any number of live event downloadables, where the number of edge servers in and the number of live event downloadables accessed by each distribution center can vary.

As shown, the edge server 130(1) includes, without limitation, a processor 132(1) and a memory 136(1), the edge server 130(2) includes, without limitation, a processor 132(2) and a memory 136(2), and the edge server 130(3) includes, without limitation, a processor 132(3) and a memory 136(3). Each of the edge server 130(1), the edge server 130(2), and the edge server 130(3) is a different compute instance. Each of the processor 132(1), the processor 132(2), and the processor 132(3) can be any instruction execution system, apparatus, or device capable of executing instructions. For example, the processor 132(1) could comprise a central processing unit, a graphics processing unit, a controller, a microcontroller, a state machine, or any combination thereof.

The memory 136(1), the memory 136(2), and the memory 136(3) store content, such as software applications and data for use by, respectively, the processor 132(1), the processor 132(2), and the processor 132(3). In particular, a portion of the memory 136(1) is designated as cache memory 180(1), a portion of the memory 136(2) is designated as cache memory 180(2), and a portion of the memory 136(3) is designated as cache memory 180(3).

Each of the memory 136(1), the memory 136(2), and the memory 136(3) can be one or more of a readily available memory, such as random-access memory, read only memory, floppy disk, hard disk, or any other form of digital storage, local or remote. In some embodiments, storage (not shown) may supplement or replace the memory 136(1), the memory 136(2), the memory 136(3), or any combination thereof.

As shown, a live event caching application 170(1) resides in the memory 136(1) of the edge server 130(1) and executes on the processor 132(1) of the edge server 130(1). A live event caching application 170(2) resides in the memory 136(2) of the edge server 130(2) and executes on the processor 132(2) of the edge server 130(2). A live event caching application 170(3) resides in the memory 136(3) of the edge server 130(3) and executes on the processor 132(3) of the edge server 130(3). The live event caching application 170(1), the live event caching application 170(2), and the live event caching application 170(3) are three different instances of the live event caching application 170.

As shown, the live event caching application 170(1) includes the cutoff threshold 172, the live event downloadable list 174, a designation list 176(1), and the cache memory 180(1). The live event caching application 170(1) computes the designation list 176(1) specifying the designations assigned, unassigned, and unassigned, respectively, that correspond, respectively, to D1, D2, D3. As described previously herein, the designation list can be computed in any technically feasible fashion (e.g., via a consistent hash or determined from the configuration data 162).

Accordingly, D1 is assigned to the edge server 130(1), and D2 and D3 are not assigned to the edge server 130(1). The live event caching application 170(1) therefore caches all segments of D1 and at least the near-live segments of D2 and D3 within the cache memory 180(1). And the live event caching application 170(1) provides full scrubbing functionality for D1 on-demand for all of the client devices 190(1) and at least near-live segments for D1, D2, and D3 on-demand for any number of the client devices 190(1). The cache memory 180(1) is described in greater detail below in conjunction with FIG. 2.

In a complementary fashion, the live event caching application 170(2) includes the cutoff threshold 172, the live event downloadable list 174, a designation list 176(2), and the cache memory 180(2). The live event caching application 170(2) computes the designation list 176(2) specifying the designations unassigned, assigned, and unassigned, respectively, that correspond, respectively, to D1, D2, D3. Accordingly, D2 is assigned to the edge server 130(2), and D1 and D3 are not assigned to the edge server 130(2). The live event caching application 170(2) therefore caches all segments of D2 and at least the near-live segments of D1 and D3 within the cache memory 180(2). And the live event caching application 170(2) provides full scrubbing functionality for D2 on-demand for all of the client devices 190(1) and at least near-live segments for D1, D2, and D3 on-demand for any number of the client devices 190(1). The cache memory 180(2) is described in greater detail below in conjunction with FIG. 2.

As shown, the live event caching application 170(3) includes the cutoff threshold 172, the live event downloadable list 174, a designation list 176(3), and the cache memory 180(3). The live event caching application 170(3) computes the designation list 176(3) specifying the designations unassigned, unassigned, and assigned, respectively, that correspond, respectively, to D1, D2, D3. Accordingly, D3 is assigned to the edge server 130(3), and D1 and D2 are not assigned to the edge server 130(3). The live event caching application 170(3) therefore caches all segments of D3 and at least the near-live segments of D1 and D2 within the cache memory 180(3). And the live event caching application 170(3) provides full scrubbing functionality for D3 on-demand for all of the client devices 190(1) and at least near-live segments for D1, D2, and D3 on-demand for any number of the client devices 190(1). The cache memory 180(3) is described in greater detail below in conjunction with FIG. 2.

Advantageously, with the disclosed techniques, because each edge server can cache near-live segments of all live event downloadables, the load associated with streaming the near-live portion of a given live event is distributed across the edge servers. Furthermore, client devices can switch between live event downloadables associated with different bitrates, languages, etc., without switching edge servers. Another advantage of the disclosed techniques is that because each edge server in a distribution center is responsible for caching all segments of a different set of live event downloadables, the overall load associated with providing scrubbing functionality for all live event downloadables is distributed across the edge servers in the distribution center. Yet another advantage of the disclosed techniques is that each edge server can move a segment of a live event downloadable that is not assigned to the edge server from the associated high priority list to an associated low priority list once the age of the segment is greater than the cutoff threshold. Consequently, the amount of cache memory allocated within an edge server to effectively stream live events and provide related scrubbing functionality can be more effectively controlled and maintained relative to what can be achieved using prior art techniques. More specifically, relative to prior art techniques, each edge server can be provisioned with less cache memory without sacrificing scrubbing functionality.

It will be appreciated that the system 100 shown herein is illustrative and that variations and modifications are possible. For example, the functionality provided by the origin application 150 and the CDN provisioning application 160 as described herein can be integrated into or distributed across any number of software applications (including one), and any number of components of the system 100. Further, the connection topology between the various units in FIG. 1 can be modified as desired.

Please note that the techniques described herein are illustrative rather than restrictive and can be altered without departing from the broader spirit and scope of the embodiments. Many modifications and variations on the functionality of the compute instance 110, the media processing pipeline 104, the origin server 140, the origin application 150, the CDN 120, the CDN provisioning application 160, the intermediate servers 122, the distribution center 124 (1)—the distribution center 124(M), the edge server 130(1), the edge server 130(2), the edge server 130(3), the live event caching application 170, and the client device 190(1)—the client devices 190(M) as described herein will be apparent to those of ordinary skill in the art without departing from the scope and spirit of the described embodiments.

Similarly, the storage, organization, amount, and/or types of data described herein are illustrative rather than restrictive and can be altered without departing from the broader spirit and scope of the embodiments. In that regard, many modifications and variations on the live media feeds 102, the downloadables, and the configuration data 162, as described herein will be apparent to those of ordinary skill in the art without departing from the scope and spirit of the described embodiments.

FIG. 2 is a more detailed illustration of the cache memory 180(1)—the cache memory 180(3) of FIG. 1, according to various embodiments. As described previously herein in conjunction with FIG. 1, the cache memory 180(1)—the cache memory 180(3) are exemplar cache memories that are included in, respectively, the edge server 130(1)—the edge server 130(3).

For explanatory purposes, the live event caching application 170(1)—the live event caching application 170(3) use, respectively, the cache memory 180(1)—the cache memory 180(3) to cache segments of three exemplar live event downloadables denoted D1, D2, and D3. The live event downloadable D1 is assigned to the edge server 130(1), the live event downloadable D2 is assigned to the edge server 130(2), and the live event downloadable D3 is assigned to the edge server 130(3).

As shown, the cache memory 180(1) includes, without limitation, a VOD high priority list 210(1), a VOD low priority list 220(1), a high priority list 230(1), a low priority list 240(1), a high priority list 230(2), a low priority list 240(2), a high priority list 230(3), and a low priority list 240(3). A first instance of a VOD caching application (not shown) selectively stores segments of VOD downloadables in the VOD high priority list 210(1) and the VOD low priority list 220(1).

The first instance of the VOD caching application can implement the VOD high priority list 210(1), the VOD low priority list 220(1), and any number and/or types of caching strategies for VOD downloadables in any technically feasible fashion. In some embodiments, the VOD high priority list 210(1) and the VOD low priority list 220(1) are both LRU lists, and the VOD caching application implements an LRU algorithm to selectively cache segments of VOD downloadables.

Because the edge server 130(1) is assigned to the live event downloadable D1, the live event caching application 170(1) stores all downloaded segments of D1 in the high priority list 230(1) until determining that D1 is obsolete. As depicted with diagonal strike-out lines and the word "empty," the live event caching application 170(1) does not use the low priority list 240(1) and therefore the low priority list 240(1) remains empty. In some other embodiments, the live event caching application 170(1) omits the low priority list 240(1) or sets the low priority list 240(1) equal to NULL or another value indicating that the low priority list 240(1) is not used.

The edge server 130(1) is not assigned to the live event downloadable D2. Consequently, the live event caching application 170(1) initially stores downloaded segments of D2 that are near-live in the high priority list 230(2) and selectively stores older downloaded segments of D2 in the low priority list 240(2). The live event caching application 170(1) implements an LRU algorithm to order the segments stored in the high priority list 230(2) such that the most recently used segment is at the head of the high priority list 230(2).

As described in greater detail below in conjunction with FIG. 3, when a cached segment stored in the high priority list 230(1) is accessed for delivery to one of the client devices 190(1), the live event caching application 170(1) determines whether the cached segment is still near-live. If the live event caching application 170(1) determines that the cached segment is still near-live, then the live event caching application 170(1) moves the cached segment to the head of the high priority list 230(2). Otherwise, the live event caching application 170(1) moves the cached segment from the high priority list 230(2) to the head of the low priority list 240(2). Notably, the live event caching application 170(1) can delete the segment at the tail of the low priority list 240(2) periodically, recursively, and/or based on any number and/or types of criteria to increase the amount of associated free cache memory (i.e., the amount of free storage space in the cache memory 180(1)).

Because the edge server 130(1) is not assigned to the live event downloadable D3, the live event caching application 170(1) initially stores downloaded segments of D3 that are near-live in the high priority list 230(3) and selectively stores older downloaded segments of D3 in the low priority list 240(3). The live event caching application 170(1) implements an LRU algorithm to order the segments stored in the high priority list 230(3) such that the most recently used segment is at the head of the high priority list 230(3).

When a cached segment stored in the high priority list 230(3) is accessed for delivery to one of the client devices 190(1), the live event caching application 170(1) determines whether the cached segment is still near-live. If the live event caching application 170(1) determines that the cached segment is still near-live, then the live event caching application 170(1) moves the cached segment to the head of the high priority list 230(3). Otherwise, the live event caching application 170(1) moves the cached segment from the high priority list 230(3) to the head of the low priority list 240(3).

As shown, the cache memory 180(2) includes, without limitation, a VOD high priority list 210(2), a VOD low priority list 220(2), a high priority list 230(4), a low priority list 240(4), a high priority list 230(5), a low priority list 240(5), a high priority list 230(6), and a low priority list 240(6). A second instance of the VOD caching application (not shown) selectively stores segments of VOD downloadables in the VOD high priority list 210(2) and the VOD low priority list 220(2).

The edge server 130(2) is not assigned to the live event downloadable D1. Consequently, the live event caching application 170(2) initially stores downloaded segments of D1 that are near-live in the high priority list 230(4) and selectively stores older downloaded segments of D1 in the low priority list 240(4). The live event caching application 170(2) implements the techniques described above in conjunction with the live event downloadable D2, the high priority list 230(2), and the low priority list 240(2) to move segments within and between the high priority list 230(4) and the low priority list 240(4) and to delete segments from the low priority list 240(4).

Because the edge server 130(2) is assigned to the live event downloadable D2, the live event caching application 170(2) stores all downloaded segments of D2 in the high priority list 230(5) until determining that D2 is obsolete. As depicted with diagonal strike-out lines and the word "empty," the live event caching application 170(2) does not use the low priority list 240(5) and therefore the low priority list 240(5) remains empty. In some other embodiments, the live event caching application 170(2) omits the low priority list 240(5) or sets the low priority list 240(5) equal to NULL or another value indicating that the low priority list 240(5) is not used.

The edge server 130(2) is not assigned to the live event downloadable D3. Consequently, the live event caching application 170(2) initially stores downloaded segments of D3 that are near-live in the high priority list 230(6) and selectively stores older downloaded segments of D3 in the low priority list 240(6). The live event caching application 170(2) implements the techniques described above in conjunction with the live event downloadable D2, the high priority list 230(2), and the low priority list 240(2) to move segments within and between the high priority list 230(6) and the low priority list 240(6) and to delete segments from the low priority list 240(6).

As shown, the cache memory 180(3) includes, without limitation, a VOD high priority list 210(3), a VOD low priority list 220(3), a high priority list 230(7), a low priority list 240(7), a high priority list 230(8), a low priority list 240(8), a high priority list 230(9), and a low priority list 240(9). A third instance of the VOD caching application (not shown) selectively stores segments of VOD downloadables in the VOD high priority list 210(3) and the VOD low priority list 220(3).

Because the edge server 130(3) is not assigned to the live event downloadable D1, the live event caching application 170(3) initially stores downloaded segments of D1 that are near-live in the high priority list 230(7) and selectively stores older downloaded segments of D1 in the low priority list 240(7). The live event caching application 170(2) implements the techniques described above in conjunction with the live event downloadable D2, the high priority list 230(2), and the low priority list 240(2) to move segments within and between the high priority list 230(7) and the low priority list 240(7) and to delete segments from the low priority list 240(7).

The edge server 130(3) is not assigned to the live event downloadable D2. Consequently, the live event caching application 170(3) initially stores downloaded segments of D2 that are near-live in the high priority list 230(8) and selectively stores older downloaded segments of D2 in the low priority list 240(8). The live event caching application 170(3) implements the techniques described above in conjunction with the live event downloadable D2, the high priority list 230(2), and the low priority list 240(2) to move segments within and between the high priority list 230(8) and the low priority list 240(8) and to delete segments from the low priority list 240(8).

Because the edge server 130(3) is assigned to the live event downloadable D3, the live event caching application 170(3) stores all downloaded segments of D3 in the high priority list 230(9) until determining that D3 is obsolete. As depicted with diagonal strike-out lines and the word "empty," the live event caching application 170(3) does not use the low priority list 240(9) and therefore the low priority list 240(9) remains empty. In some other embodiments, the live event caching application 170(3) omits the low priority list 240(9) or sets the low priority list 240(9) equal to NULL or another value indicating that the low priority list 240(9) is not used.

Moving Cached Segments Within and Between Lists

Figure 3:
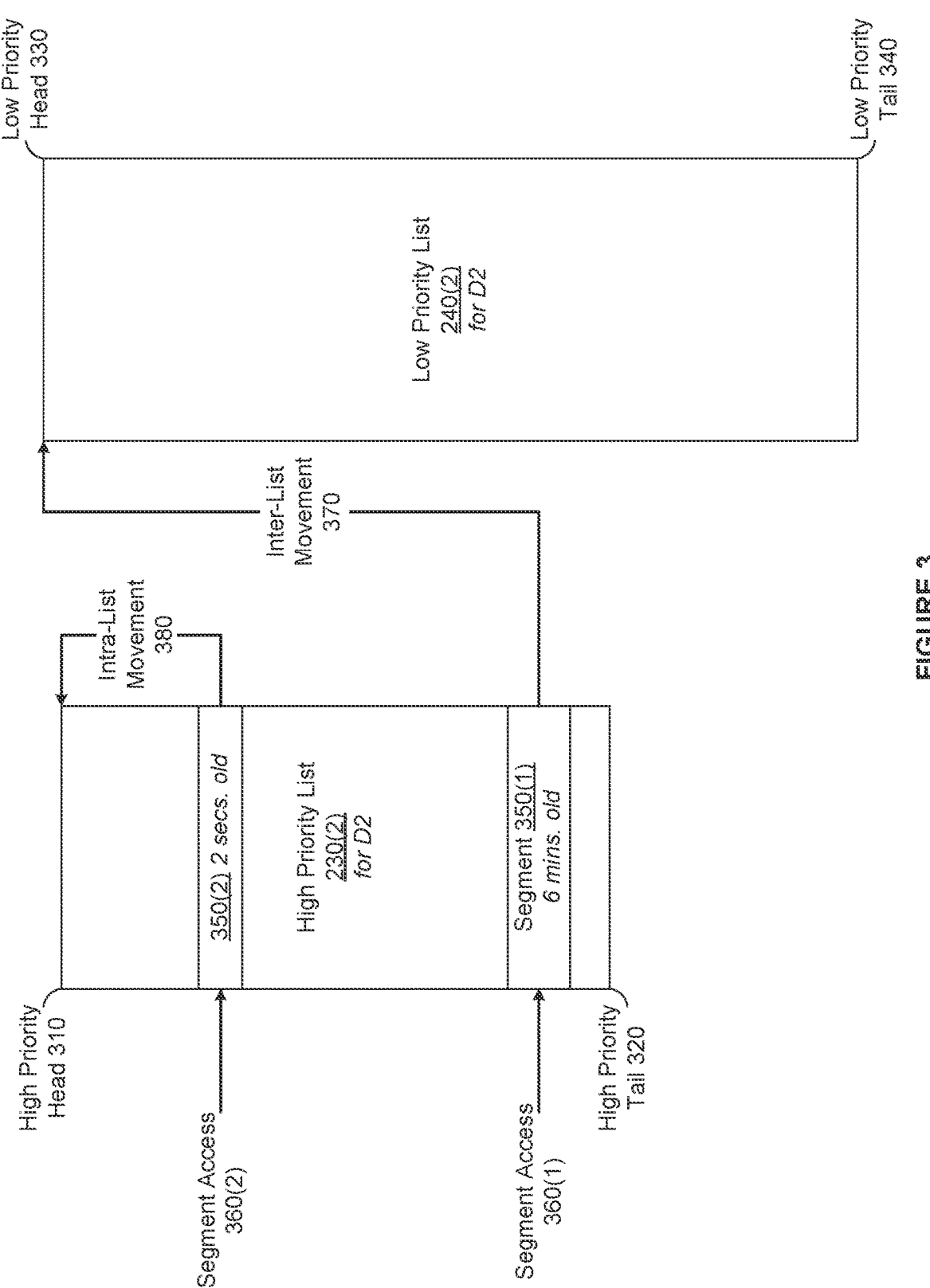
FIG. 3 illustrates exemplar movements associated with accessing the different segments stored in one of the high priority lists of FIG. 2, according to various embodiments.

FIG. 3 illustrates exemplar movements associated with accessing the different segments stored in one of the high priority lists of FIG. 2, according to various embodiments. More specifically, an inter-list movement 370 and an intra-list movement 380 are exemplary movements associated with accessing different exemplar segments stored in the high priority list 230(2).

As described previously herein in conjunction with FIG. 2, the high priority list 230(2) and the low priority list 240(2) are included in the cache memory 180(1) of the edge server 130(1). The live event caching application 170(1) uses the high priority list 230(2) and the low priority list 240(2) to cache segments of an exemplar live event downloadable denoted as D2. Because the edge server 130(1) is not assigned to D2, the live event caching application 170(1) designates D2 as an unassigned downloadable.

As shown, the high priority list 230(2) includes, without limitation, a segment 350(1) and a segment 350(2). The segment 350(1) and the segment 350(2) are exemplar segments of D2 that are, respectively, six minutes old and two seconds old at a point-in-time depicted in FIG. 3. Therefore, relative to an exemplar value of five minutes for the cutoff threshold 172(1) (depicted previously in FIG. 1), the segment 350(1) is no longer a near-live segment and the segment 350(2) is still a near-live segment.

As described previously herein, the live event caching application 170(1) stores segments in the high priority list 230(2) in LRU order, where a segment stored at a high priority head 310 is the most recently accessed and a segment stored at a high priority tail 320 is the least recently accessed. Because the number of positions between the segment 350(1) and the high priority head 310 is greater than the number of positions between the segment 350(2) and the high priority head 310, the last access of the segment 350(1) occurred no later than the last access of the segment 350(2).

A segment access 360(1) and a segment access 360(2) depict sequential accesses of, respectively, the segment 350(1) and the segment 350(2). In response to the segment access 360(1) and because the segment 350(1) is included in an unassigned downloadable, the live event caching application 170(1) computes the current age of the segment 350(1) based on an associated creation time and the current time. The live event caching application 170(1) compares the age of the segment 350(1) to the cutoff threshold 172(1) to determine that the segment 350(1) is no longer a near-live segment. As an inter-list movement 370 visually depicts, the live event caching application 170(1) therefore moves the segment 350(1) from the high priority list 230(2) to the low priority head 330 of the low priority list 240(2). Advantageously, the live event caching application 170(1) can recursively delete the segment at a low priority tail 340 to increase the amount of associated free cache memory.

In response to the segment access 360(2) and because the segment 350(2) is included in an unassigned downloadable, the live event caching application 170(1) computes the current age of the segment 350(2) based on an associated creation time and the current time. The live event caching application 170(1) compares the age of the segment 350(2) to the cutoff threshold 172(1) to determine that the segment 350(2) is still a near-live segment. As an intra-list movement 380 visually depicts, the live event caching application 170(1) therefore moves the segment 350(2) to the high priority head 310 of the high priority list 230(2).

Figure 4B:
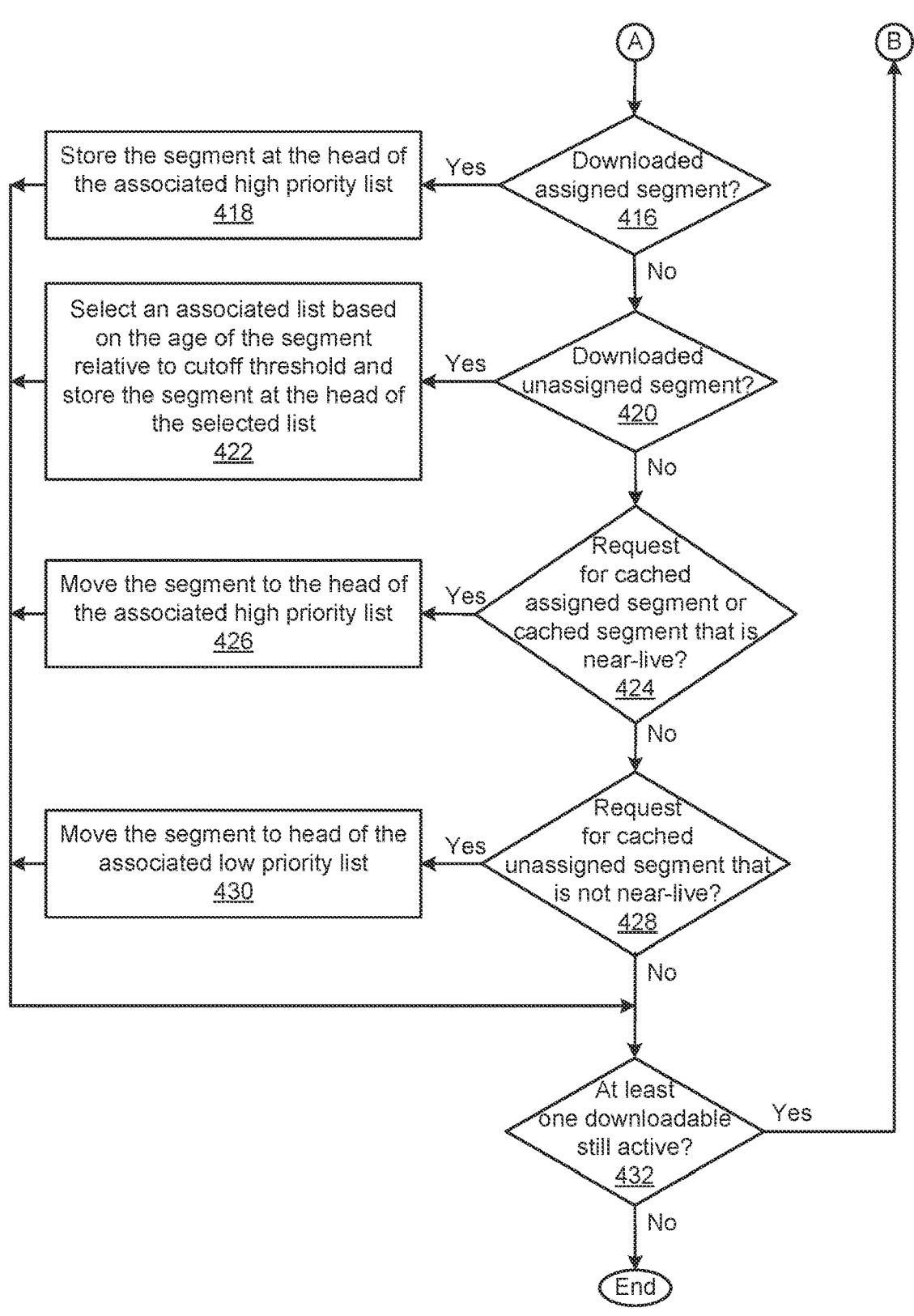

FIGS. 4A-4B set forth a flow diagram of method steps for caching segments of live event downloadables, according to various embodiments. Although the method steps are described with reference to the systems of FIGS. 1-3, persons skilled in the art will understand that any system configured to implement the method steps, in any order, falls within the scope of the embodiments.

As shown, a method 400 begins at step 402, where, for each live event downloadable, live event caching application 170 generates an empty high priority list, generates an empty low priority list, and designates the live event downloadable as an assigned downloadable or an unassigned downloadable. At step 404, the live event caching application 170 waits for a cache trigger.

At step 406, the live event caching application 170 determines whether to delete cached segment(s). If, at step 406, the live event caching application 170 determines to delete cached segment(s), then the method 400 proceeds to step 408. At step 408, the live event caching application 170 deletes zero or more cached segments of zero or more obsolete downloadables. At step 410, the live event caching application 170 identifies any assigned downloadable(s) and any unassigned downloadable(s) that are obsolete and re-designates any identified downloadable(s) as obsolete downloadable(s).

At step 412, for each unassigned downloadable, the live event caching application 170 moves zero or more segments that are older than a cutoff threshold from the tail of the associated high priority list to the head of the associated low priority list. At step 414, the live event caching application 170 deletes zero or more segment(s) from low priority list(s) based on a free cache threshold.

If, however, at step 406, the live event caching application 170 determines not to delete any cached segments, then the method 400 proceeds directly to step 416.

At step 416, the live event caching application 170 determines whether the cache trigger is a downloaded assigned segment. If, at step 416, the live event caching application 170 determines that the cache trigger is a downloaded assigned segment, then the method 400 proceeds to step 418. At step 418, the live event caching application 170 stores the segment at the head of the associated high priority list. The method 400 then proceeds directly to step 432.

If, however, at step 416, the live event caching application 170 determines that the cache trigger is not a downloaded assigned segment, then the method 400 proceeds directly to step 420.

At step 420, the live event caching application 170 determines whether the cache trigger is a downloaded unassigned segment. If, at step 420, the live event caching application 170 determines that the cache trigger is a downloaded unassigned segment, then the method 400 proceeds to step 422. At step 422, the live event caching application 170 selects an associated list based on the age of the segment relative to the cutoff threshold and stores the segment at the head of the selected list. The method 400 then proceeds directly to step 432.

If, however, at step 420, the live event caching application 170 determines that the cache trigger is not a downloaded unassigned segment, then the method 400 proceeds directly to step 424.

At step 424, the live event caching application 170 determines whether the cache trigger is a request for a cached assigned segment or a cached unassigned segment that is near-live. If, at step 424, the live event caching application 170 determines that the cache trigger is a request for a cached assigned segment or a cached unassigned segment that is near-live, then the method 400 proceeds to step 426. At step 426, the live event caching application 170 moves the segment to the head of the associated high priority list. The method 400 then proceeds directly to step 432.

If, however, at step 424, the live event caching application 170 determines that the cache trigger is not a request for a cached assigned segment or a cached unassigned segment that is near-live, then the method 400 proceeds directly to step 428.

At step 428, the live event caching application 170 determines whether the cache trigger is a request for a cached unassigned segment that is not near-live. If, at step 428, the live event caching application 170 determines that the cache trigger is a request for a cached unassigned segment that is not near-live, then the method 400 proceeds to step 430. At step 430, the live event caching application 170 moves the segment to the head of the associated low priority list.

At step 432, the live event caching application 170 determines whether at least one downloadable is still active. If, at step 432, the live event caching application 170 determines that at least one downloadables is still active, then the method 400 returns to step 404, where the live event caching application 170 waits for a cache trigger.

If, however, at step 432, the live event caching application 170 determines that no downloadable is still active, then the method 400 terminates.

In sum, the disclosed techniques can be used to distribute the responsibility for caching and delivering near-live segments of live event downloadables across edge servers in a distribution center while assigning cache responsibility for caching and delivering older segments of a different set of the live event downloadables to each of the edge servers. In some embodiments, a different instance of a live event caching application executes on the processor of each edge server in a distribution center. Each instance of the live event caching application applies the same hashing function on identifiers for the live event downloadables to designate each live event downloadable as either an assigned downloadable or an unassigned downloadable.

The live event caching application uses a different pair of lists to cache segments of different live event downloadables in the associated cache memory. Each pair of lists includes a high priority list and a low priority list. The live event caching application stores each downloaded segment of an assigned downloadable in the high priority list for the assigned downloadable until the live event caching application determines that the assigned downloadable is obsolete and re-designates the assigned downloadable as an obsolete downloadable. Notably, the low priority lists for assigned downloadables are not used.

The live event caching application initially stores each downloaded segment of an unassigned downloadable that is near-live in the high priority list for the unassigned downloadable. By contrast, the live event caching application stores each downloaded segment of an unassigned downloadable that is not near-live at the head of the low priority list for the unassigned downloadable. When a segment that is stored in a high priority list for an unassigned downloadable is accessed, the live event caching application determines whether the segment is still near-live. If the live event caching application determines that the segment is still near-live, then the live event caching application moves the segment to the head of the high priority list. Otherwise, the live event caching application moves the segment from the high priority list to the head of the corresponding low priority list.

Periodically, the live event caching application re-evaluates the segment at the tail of the high priority list for each unassigned downloadable to determine whether the segment is still near-live. If the segment is no longer near-live, then the live event caching application moves the segment from the tail of the high priority list to the head of the corresponding low priority list. Periodically and/or as-needed, the live event caching application deletes one or more segments from low priority lists for obsolete downloadables, high priority lists for obsolete downloadables, and the tails of low priority lists for unassigned downloadables to increase the amount of associated free cache memory.

At least one technical advantage of the disclosed techniques relative to the prior art is that, with the disclosed techniques, an edge server caches all segments of each live event downloadable that is assigned to the edge server as well as recent segments of other live event downloadables in high priority lists, where the age of each recent segment is not greater than a cutoff threshold. Thus, with the disclosed techniques, the edge server can move a segment of any live event downloadable that is not assigned to the edge server from a high priority list to a low priority list once the age of the segment is greater than the cutoff threshold Further, with the disclosed techniques, edge servers can delete segments from low priority lists as-needed to increase the amount of free cache memory. Consequently, with the disclosed techniques, the total amount of cache memory available to an edge server of a CDN for streaming live events and for providing related scrubbing functionality can be more effectively controlled and maintained relative to what can be achieved using prior art techniques. These technical advantages provide one or more technological advancements over prior art approaches.

1. In some embodiments, a method for caching segments associated with live events that is implemented by a computer device comprises, at a first point-in-time, storing a first segment of a first downloadable that is associated with a first live event in a first high priority list; at a second point-in-time, determining that the first segment is at a tail of the first high priority list, wherein the second point-in-time is subsequent to the first point-in-time; upon determining that the first segment is at the tail of the first high priority list, further determining that an age of the first segment is greater than a cutoff threshold; and in response to determining that the age of the first segment is greater than the cutoff threshold, moving the first segment from the first high priority list to a first low priority list.

2. The method of clause 1, wherein the computer device comprises an edge server included in a content delivery network, and wherein the first downloadable is not assigned to the edge server.

3. The method of clauses 1 or 2, further comprising receiving a request from a client device for a second segment of a second downloadable that is associated with the first live event; determining that the second segment is stored in a second high priority list and the second downloadable is assigned to the computer device; and in response to determining that the second downloadable is assigned to the computer device, moving the second segment to a head of the second high priority list.

4. The method of any of clauses 1-3, further comprising determining that the second downloadable has become obsolete, and deleting the second segment from the second high priority list.

5. The method of any of clauses 1-4, wherein, at a third point-in-time that is subsequent to when the first live event completes, a plurality of segments of the second downloadable that includes the second segment and spans a duration of the first live event is stored in the second high priority list.

6. The method of any of clauses 1-5, wherein a portion of a live video feed is encoded based on two different encoding parameters to generate the first segment and the second segment.

7. The method of any of clauses 1-6, further comprising receiving a request from a client device for a second segment of the first downloadable; determining that the second segment is stored in the first high priority list and an age of the second segment is not greater than the cutoff threshold; and in response to determining that the age of the second segment is not greater than the cutoff threshold, moving the second segment to a head of the first high priority list.

8. The method of any of clauses 1-7, further comprising receiving a request from a client device for a second segment of the first downloadable; determining that the second segment is stored in the first high priority list and that an age of the second segment is greater than the cutoff threshold; and in response to determining that the age of the second segment is greater than the cutoff threshold, moving the second segment from the first high priority list to a head of the first low priority list.

9. The method of any of clauses 1-8, further comprising deleting the first segment from a tail of the first low priority list during the first live event.

10. The method of any of clauses 1-9, wherein the first segment is moved from the tail of the first high priority list to a head of the first low priority list.

11. In some embodiments, one or more non-transitory computer readable media include instructions that, when executed by one or more processors included in an edge server, cause the one or more processors to cache segments associated with live events by performing the steps of, at a first point-in-time, storing a first segment of a first downloadable that is associated with a first live event in a first high priority list; at a second point-in-time, determining that the first segment is at a tail of the first high priority list, wherein the second point-in-time is subsequent to the first point-in-time; upon determining that the first segment is at the tail of the first high priority list, further determining that an age of the first segment is greater than a cutoff threshold; and in response to determining that the age of the first segment is greater than the cutoff threshold, moving the first segment from the first high priority list to a first low priority list.

12. The one or more non-transitory computer readable media of clause 11, wherein the edge server is included in a plurality of edge servers that are associated with a first geographical region, and wherein the first downloadable is assigned to a different edge server included in the plurality of edge servers.

13. The one or more non-transitory computer readable media of clauses 11 or 12, further comprising receiving a request from a client device for a second segment of a second downloadable that is associated with the first live event; determining that the second segment is stored in a second high priority list and the second downloadable is assigned to the edge server; and in response to determining that the second downloadable is assigned to the edge server, moving the second segment to a head of the second high priority list.

14. The one or more non-transitory computer readable media of any of clauses 11-13, wherein, at a third point-in-time that is subsequent to when the first live event completes, a plurality of segments of the second downloadable that includes the second segment and spans a duration of the first live event is stored in the second high priority list.

15. The one or more non-transitory computer readable media of any of clauses 11-14, further comprising computing a difference between a creation time associated with the first segment and a current time to determine the age of the first segment.

16. The one or more non-transitory computer readable media of any of clauses 11-15, wherein a portion of a live video feed, a live audio feed, or a live subtitle feed is encoded to generate the first segment.

17. The one or more non-transitory computer readable media of any of clauses 11-16, further comprising receiving a request from a client device for a second segment of the first downloadable; determining that the second segment is stored in the first high priority list and an age of the second segment is not greater than the cutoff threshold; and in response to determining that the age of the second segment is not greater than the cutoff threshold, moving the second segment to a head of the first high priority list.

18. The one or more non-transitory computer readable media of any of clauses 11-17, further comprising receiving a request from a client device for a second segment of the first downloadable; determining that the second segment is stored in the first high priority list and that an age of the second segment is greater than the cutoff threshold; and in response to determining that the age of the second segment is greater than the cutoff threshold, moving the second segment from the first high priority list to a head of the first low priority list.

19. The one or more non-transitory computer readable media of any of clauses 11-18, wherein both the first high priority list and the first low priority list are dedicated solely to the first downloadable.

20. In some embodiments, a system comprises one or more memories storing instructions and one or more processors coupled to the one or more memories that, when executing the instructions, perform the steps of at a first point-in-time, storing a first segment of a first downloadable that is associated with a first live event in a first high priority list; at a second point-in-time, determining that the first segment is at a tail of the first high priority list, wherein the second point-in-time is subsequent to the first point-in-time; upon determining that the first segment is at the tail of the first high priority list, further determining that an age of the first segment is greater than a cutoff threshold; and in response to determining that the age of the first segment is greater than the cutoff threshold, moving the first segment from the first high priority list to a first low priority list.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for caching segments associated with live events that is implemented by a first computer device included in a plurality of computer devices, the method comprising:

at a first point-in-time, storing a first segment of a first downloadable that is associated with a first live event in a first high priority list;

at a second point-in-time, determining that the first segment is at a tail of the first high priority list, wherein the second point-in-time is subsequent to the first point-in-time;

upon determining that the first segment is at the tail of the first high priority list, further determining that an age of the first segment is greater than a cutoff threshold; and in response to determining, by the first computer device, that the first downloadable is uniquely assigned to a second computer device included in the plurality of computer devices, and determining that the age of the first segment is greater than the cutoff threshold, moving the first segment from the first high priority list to a first low priority list.

2. The method of claim 1, wherein the first computer device comprises an edge server included in a content delivery network.

3. The method of claim 1, further comprising:

receiving a request from a client device for a second segment of a second downloadable that is associated with the first live event;

determining that the second segment is stored in a second high priority list and the second downloadable is uniquely assigned to the first computer device; and in response to determining that the second downloadable is uniquely assigned to the first computer device, moving the second segment to a head of the second high priority list.

4. The method of claim 3, further comprising determining that the second downloadable has become obsolete, and deleting the second segment from the second high priority list.

5. The method of claim 3, wherein, at a third point-in-time that is subsequent to when the first live event completes, a plurality of segments of the second downloadable that includes the second segment and spans a duration of the first live event is stored in the second high priority list.

6. The method of claim 3, wherein a portion of a live video feed is encoded based on two different encoding parameters to generate the first segment and the second segment.

7. The method of claim 1, further comprising:

receiving a request from a client device for a second segment of the first downloadable;

determining that the second segment is stored in the first high priority list and an age of the second segment is not greater than the cutoff threshold; and in response to determining that the age of the second segment is not greater than the cutoff threshold, moving the second segment to a head of the first high priority list.

8. The method of claim 1, further comprising:

receiving a request from a client device for a second segment of the first downloadable;

determining that the second segment is stored in the first high priority list and that an age of the second segment is greater than the cutoff threshold; and in response to determining that the age of the second segment is greater than the cutoff threshold, moving the second segment from the first high priority list to a head of the first low priority list.

9. The method of claim 1, further comprising deleting the first segment from a tail of the first low priority list during the first live event.

10. The method of claim 1, wherein the first segment is moved from the tail of the first high priority list to a head of the first low priority list.

11. One or more non-transitory computer readable media including instructions that, when executed by one or more processors included in a first edge server included in a plurality of edge servers, cause the one or more processors to cache segments associated with live events by performing the steps of:

at a first point-in-time, storing a first segment of a first downloadable that is associated with a first live event in a first high priority list;

at a second point-in-time, determining that the first segment is at a tail of the first high priority list, wherein the second point-in-time is subsequent to the first point-in-time;

upon determining that the first segment is at the tail of the first high priority list, further determining that an age of the first segment is greater than a cutoff threshold; and in response to determining, by the first edge server, that the first downloadable is uniquely assigned to a second edge server included in the plurality of edge servers, and determining that the age of the first segment is greater than the cutoff threshold, moving the first segment from the first high priority list to a first low priority list.

12. The one or more non-transitory computer readable media of claim 11, the plurality of edge servers are associated with a first geographical region.

13. The one or more non-transitory computer readable media of claim 11, further comprising:

receiving a request from a client device for a second segment of a second downloadable that is associated with the first live event;

determining that the second segment is stored in a second high priority list and the second downloadable is uniquely assigned to the first edge server; and in response to determining that the second downloadable is uniquely assigned to the first edge server, moving the second segment to a head of the second high priority list.

14. The one or more non-transitory computer readable media of claim 13, wherein, at a third point-in-time that is subsequent to when the first live event completes, a plurality of segments of the second downloadable that includes the second segment and spans a duration of the first live event is stored in the second high priority list.

15. The one or more non-transitory computer readable media of claim 11, further comprising computing a difference between a creation time associated with the first segment and a current time to determine the age of the first segment.

16. The one or more non-transitory computer readable media of claim 11, wherein a portion of a live video feed, a live audio feed, or a live subtitle feed is encoded to generate the first segment.

17. The one or more non-transitory computer readable media of claim 11, further comprising:

receiving a request from a client device for a second segment of the first downloadable;

determining that the second segment is stored in the first high priority list and an age of the second segment is not greater than the cutoff threshold; and in response to determining that the age of the second segment is not greater than the cutoff threshold, moving the second segment to a head of the first high priority list.

18. The one or more non-transitory computer readable media of claim 11, further comprising:

receiving a request from a client device for a second segment of the first downloadable;

determining that the second segment is stored in the first high priority list and that an age of the second segment is greater than the cutoff threshold; and in response to determining that the age of the second segment is greater than the cutoff threshold, moving the second segment from the first high priority list to a head of the first low priority list.

19. The one or more non-transitory computer readable media of claim 11, wherein both the first high priority list and the first low priority list are dedicated solely to the first downloadable.

20. A first system included in a plurality of systems, the first system comprising:

one or more memories storing instructions; and one or more processors coupled to the one or more memories that, when executing the instructions, perform the steps of:

at a first point-in-time, storing a first segment of a first downloadable that is associated with a first live event in a first high priority list;

at a second point-in-time, determining that the first segment is at a tail of the first high priority list, wherein the second point-in-time is subsequent to the first point-in-time;

upon determining that the first segment is at the tail of the first high priority list, further determining that an age of the first segment is greater than a cutoff threshold; and in response to determining, by the first system, that the first downloadable is uniquely assigned to a second system included in the plurality of systems, and determining that the age of the first segment is greater than the cutoff threshold, moving the first segment from the first high priority list to a first low priority list.

* * * * *